(12) United States Patent
Berglund et al.

(10) Patent No.: US 9,330,437 B2
(45) Date of Patent: May 3, 2016

(54) METHOD FOR AUTOMATICALLY GENERATING PRESENTATION SLIDES CONTAINING PICTURE ELEMENTS

(75) Inventors: Carl Fredrik Alexander Berglund, Malmö (SE); Marcus Eriksson, Malmö (SE); Dan Zacharias Gärdenfors, Malmö (SE)

(73) Assignee: BlackBerry Limited, Waterloo, Ontario (CA)

( * ) Notice: Subject to any disclaimer, the term of this patent is extended or adjusted under 35 U.S.C. 154(b) by 421 days.

(21) Appl. No.: 13/614,929

(22) Filed: Sep. 13, 2012

(65) Prior Publication Data

US 2014/0071168 A1    Mar. 13, 2014

(51) Int. Cl.
*G06T 3/40* (2006.01)
*G06T 11/60* (2006.01)

(52) U.S. Cl.
CPC .. *G06T 3/40* (2013.01); *G06T 11/60* (2013.01)

(58) Field of Classification Search
None
See application file for complete search history.

(56) References Cited

U.S. PATENT DOCUMENTS

| | | |
|---|---|---|
| 2003/0088825 A1 | 5/2003 | Chakraborty |
| 2006/0109510 A1 | 5/2006 | Widdowson et al. |
| 2008/0025566 A1 | 1/2008 | Widdowson et al. |
| 2009/0179998 A1 | 7/2009 | Steinberg et al. |
| 2010/0088605 A1 | 4/2010 | Livshin et al. |
| 2010/0157340 A1 | 6/2010 | Chen et al. |
| 2010/0218089 A1 | 8/2010 | Chao et al. |
| 2010/0322521 A1* | 12/2010 | Tal ............................ G06T 11/60 382/199 |
| 2011/0013848 A1* | 1/2011 | Hasegawa ....................... 382/232 |
| 2012/0075433 A1 | 3/2012 | Tatzgern et al. |
| 2012/0159332 A1 | 6/2012 | Piccinini et al. |
| 2013/0230253 A1* | 9/2013 | Stankiewicz ......... G06K 9/4671 382/195 |

FOREIGN PATENT DOCUMENTS

| | | |
|---|---|---|
| EP | 0544255 | 11/1992 |
| EP | 1085464 | 3/2001 |
| EP | 1220531 | 7/2002 |
| WO | 03/012678 | 2/2003 |
| WO | 2008/016533 | 2/2008 |
| WO | 2010/014294 | 2/2010 |
| WO | 2010/134927 | 11/2010 |
| WO | 2012/057891 | 5/2012 |

OTHER PUBLICATIONS

European Patent Office, European Search Report issued in EP Application No. 12184333, search completed Jan. 31, 2013, 1 page.
Steven J. Simske, "Low-Resolution Photo/Drawing Classification: Metrics, Method and Archiving Optimization", ICIP 2005 IEEE International Conference on Image Processing, Piscataway, NJ, vol. 2, Sep. 11, 2005, 4 pages.
European Patent Office, Communication pursuant to Rules 70(2) and 70a(2) EPC and reference to Rule 39(1) EPC in connection with European Patent Application No. 12184333.8, dated Mar. 24, 2014, 2 pages.

* cited by examiner

*Primary Examiner* — James A Thompson
(74) *Attorney, Agent, or Firm* — Fish & Richardson P.C.

(57) ABSTRACT

A computer-implemented method for intelligently generating presentations, the method comprising the steps of: analysing the variation in colours of pixels in the digital image; and, if the variation is below a predetermined threshold, applying one or more rules to increase visibility of the digital image in the presentation.

19 Claims, 10 Drawing Sheets

Functional image examples

610

620

630

Non-functional image examples

640

650

METHOD FOR AUTOMATICALLY GENERATING PRESENTATION SLIDES CONTAINING PICTURE ELEMENTS

FIELD OF THE TECHNOLOGY

The present disclosure relates to electronic devices, methods of operation thereof, and computer software for facilitating the automatic generation of presentations.

BACKGROUND

Existing presentation software requires substantial user input and effort to organise and arrange the elements of a presentation into a visually appealing layout. In some scenarios it may be impractical or difficult to provide such extensive user input. One such scenario is in mobile devices that have small form factors and limited user input options available. Therefore, there is a need for mobile presentation creation software that can create visually impressive presentations quickly and on-the-fly, with limited user input.

In order to create presentations that are visually appealing, intelligent decisions would have to be made by the software to ensure the best design choices are made given the limited user input provided. However, considering the resource constraints in electronic devices, particularly in mobile devices, such intelligent decisions need to be made efficiently without overexerting the device and draining power.

BRIEF DESCRIPTION OF DRAWINGS

Examples of the present proposed approach will now be described in detail with reference to the accompanying drawings, in which.

DETAILED DESCRIPTION

Figure 1:
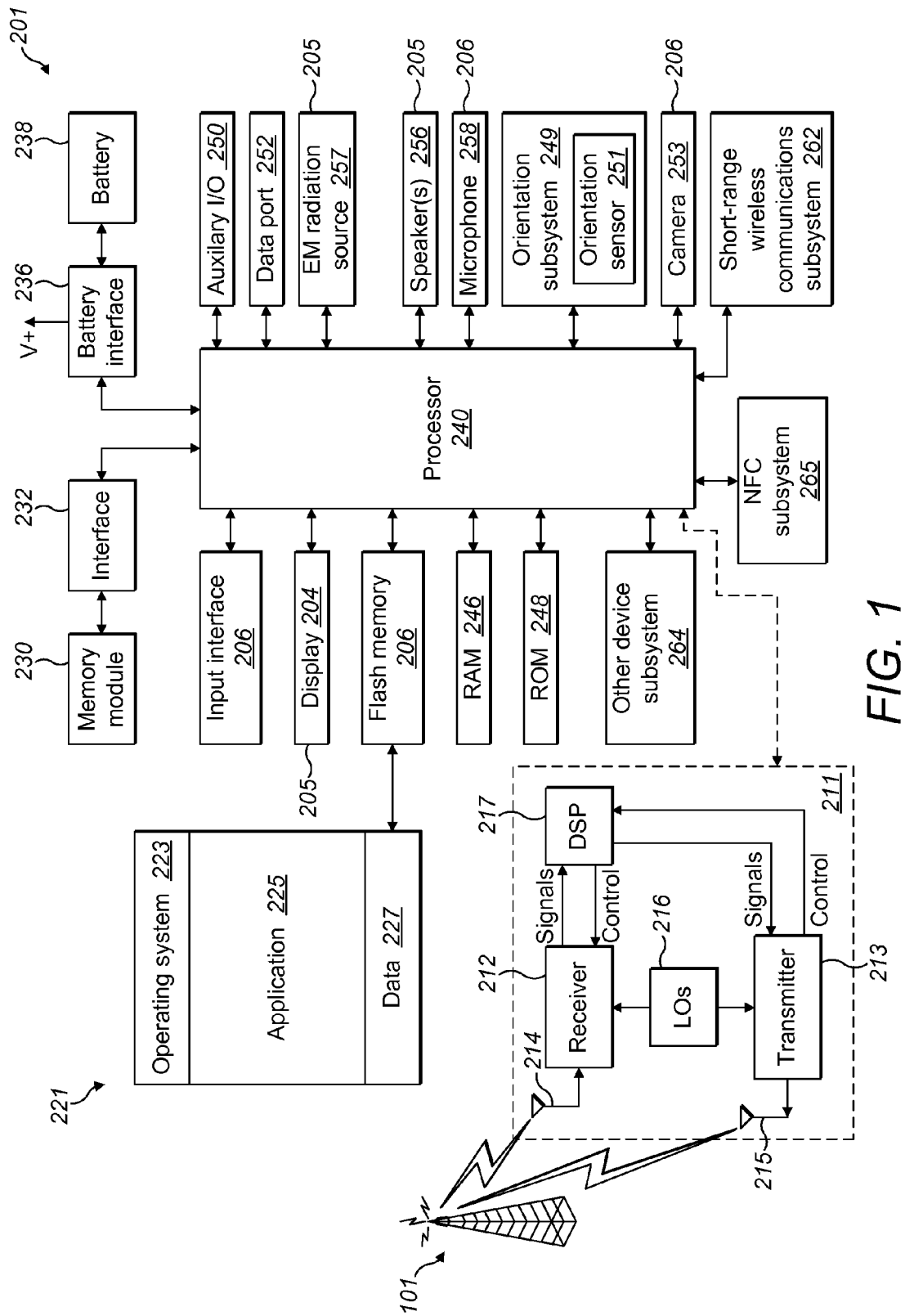
FIG. 1 is a block diagram illustrating an electronic device in accordance with example embodiments of the present disclosure.

In one embodiment, the present disclosure provides a computer-implemented method of generating a presentation comprising an arrangement of elements including a digital image comprising a plurality of pixels, the method comprising: analysing a variation of a property of the pixels in the digital image; and, if said variation in the digital image satisfies a predetermined criterion, applying one or more rules to increase visibility of the digital image in the arrangement of elements.

This embodiment provides a fast and efficient way of determining whether an image provided to a presentation software is an important, functional image, or a lower-priority, non-functional image. By performing a single scan through of the pixels in an image and analysing the variation in a property of the pixels, the embodiment can quickly and efficiently determine whether the image is a functional image or not, without requiring complex image recognition algorithms. If an image is determined to be functional, and therefore of high importance, it is automatically arranged so as to give it a higher visibility over other images, thereby intelligently arranging the layout of a presentation with only limited user input.

In some example embodiments, the one or more rules include: scaling the digital image so that no portion of the digital image lies outside visible boundaries of the presentation. By scaling the image in this way, the embodiment ensures that a functional image is fully visible and not cropped out by the finite visible area of the presentation.

In some example embodiments, the one or more rules include: arranging other elements of the presentation so that they do not overlap the digital image. By arranging the elements of the presentation in this way, the amount that the functional image is obscured is kept to a minimum, without requiring a user to perform such rearrangements themselves.

In some example embodiments, the one or more rules include: arranging the z-order of the elements of the arrangement so that the digital image has a higher z-order than other elements of the presentation.

In some example embodiments, the one or more rules include: scaling the digital image to increase its size in the arrangement of elements. By automatically increasing the size of functional images, they are automatically given greater prominence in the presentation.

In some example embodiments, the one or more rules include: maintaining an aspect ratio of the digital image. By fixing the aspect ratio of a functional image, the visual fidelity of the image is maintained.

In some example embodiments, the one or more rules include: inhibiting cropping of the digital image.

In some example embodiments, the one or more rules include: positioning the digital image towards the centre of the arrangement of elements. By automatically positioning functional images towards the centre of an arrangement of presentation elements, the prominence of the functional image is highlighted in the intelligent arrangement.

In some example embodiments, said property is pixel luminance. By investigating the pixel luminance of each pixel in an image, the proposed solution can quickly get a rough overview of how many different shades are used and can more efficiently infer how many different colours were used.

In some example embodiments, said pixel luminance is calculated as a linear combination of pixel colour components.

In some example embodiments, the analysing comprises analysing a histogram of a property of the pixels in the digital image.

In some example embodiments, the analysing comprises calculating a ratio of the number of pixels with a predetermined subset of values of said property to the total number of pixels in the digital image. By performing this analysis, the proposed solution can quickly determine if a large proportion of the pixels in an image share a limited range of values.

In some example embodiments, the predetermined subset of values comprises a predetermined number of the most common values in the digital image.

In some example embodiments, the method further comprising: if said variation in the digital image does not satisfy the predetermined criterion: determining that a region of the digital image has high saliency; and, applying one or more rules to increase visibility of said region in the arrangement of elements. By identifying high saliency regions of a non-functional image, the proposed solution can intelligently provide higher priority to the presentation of important regions of images.

In some example embodiments, the determining that a region of the digital image has a high saliency comprises generating a saliency map of the digital image.

In some example embodiments, the determining that a region of the digital image has high saliency comprises detecting one or more of faces and text regions in the digital image.

In some example embodiments, the one or more rules to increase visibility of the region include: scaling the digital image to extend to a visible boundary of the presentation while ensuring no portion of said region of the digital image lies outside any visible boundaries of the presentation. This allows a non-functional digital image to be expanded beyond the boundaries of a presentation, but ensures that any high saliency regions still remains visible.

In some example embodiments, the one or more rules to increase visibility of the region include: arranging other elements of the presentation so that they do not overlap said region, while permitting the other elements to overlap other regions of said digital image.

In some example embodiments, said elements in the arrangement include one or more of: a background element, another digital image, a bullet element, a text element, and a title element.

In some example embodiments, the predetermined criterion comprises the variation being below a predetermined threshold. By using the criterion of a low variation in pixel properties, the proposed solution is able to quickly determine if an image is a functional image, as functional images tend to have low visual complexity and a limited variation in pixel properties, such as colour.

In another embodiment, the present disclosure provides an electronic device comprising one or more processors and memory comprising instructions which, when executed by one or more of the processors, cause the device to analyse a variation of a property of the pixels in the digital image; and, if said variation in the digital image satisfies a predetermined criterion, apply one or more rules to increase visibility of the digital image in the arrangement of elements.

In yet another embodiment, the present disclosure provides A computer readable medium comprising instructions which, when executed by one or more processors of an electronic device, cause the device to analyse a variation of a property of the pixels in the digital image; and, if said variation in the digital image satisfies a predetermined criterion, apply one or more rules to increase visibility of the digital image in the arrangement of elements.

Reference will now be made to FIG. 1 which illustrates an electronic device 201 in which example embodiments described in the present disclosure can be applied.

In the illustrated example embodiment, the electronic device 201 is a communication device and, more particularly, is a mobile communication device having data and voice communication capabilities, and the capability to communicate with other computer systems; for example, via the Internet.

Depending on the functionality provided by the electronic device 201, in various example embodiments the electronic device 201 may be a multiple-mode communication device configured for both data and voice communication, a mobile telephone, such as a phone, a wearable computer such as a watch, a tablet computer such as a slate computer, a personal digital assistant (PDA), or a computer system. The electronic device 201 may take other forms apart from those specifically listed above. The electronic device may also be referred to as a mobile communications device, a communication device, a mobile device and, in some cases, as a device.

The electronic device 201 includes a controller including one or more processors 240 (such as a microprocessor) which controls the overall operation of the electronic device 201. The processor 240 interacts with device subsystems such as a wireless communication subsystem 211 for exchanging radio frequency signals with a wireless network 101 to perform communication functions. The processor 240 is communicably coupled with additional device subsystems including one or more output interfaces 205 (such as a display 204 and/or a speaker 256 and/or electromagnetic (EM) radiation source 257), one or more input interfaces 206 (such as a camera 253, microphone 258, keyboard (not shown), control buttons (not shown), a navigational input device (not shown), and/or a touch-sensitive overlay (not shown)) associated with a touch-screen display 204, an orientation subsystem 249, memory (such as flash memory 244, random access memory (RAM) 246, read only memory (ROM) 248, etc.), auxiliary input/output (I/O) subsystems 250, a data port 252 (which may be a serial data port, such as a Universal Serial Bus (USB) data port), a near field communications (NFC) subsystem 265, a short-range communication subsystem 262 and other device subsystems generally designated as 264. Some of the subsystems shown in FIG. 1 perform communication-related functions, whereas other subsystems may provide "resident" or on-device functions.

In at least some example embodiments, the electronic device 201 may include a touchscreen display which acts as both an input interface 206 (i.e. touch-sensitive overlay) and an output interface 205 (i.e. display). The touchscreen display may be constructed using a touch-sensitive input surface which is connected to an electronic controller and which overlays the display 204. The touch-sensitive overlay and the electronic controller provide a touch-sensitive input interface 206 and the processor 240 interacts with the touch-sensitive overlay via the electronic controller.

As noted above, in some example embodiments, the electronic device 201 may include a communication subsystem 211 which allows the electronic device 201 to communicate over a wireless network 101. The communication subsystem 211 includes a receiver 212, a transmitter 213, and associated components, such as one or more antenna elements 214 and 215, local oscillators (LOs) 216, and a processing module such as a digital signal processor (DSP) 217. The antenna elements 214 and 215 may be embedded or internal to the electronic device 201 and a single antenna may be shared by both receiver and transmitter. The particular design of the wireless communication subsystem 211 depends on the wireless network 101 in which electronic device 201 is intended to operate. The wireless network 101 may, for example, be a cellular (such as GSM, GPRS, CDMA and EDGE) and/or a non-cellular network (for example local WiFi networks).

In at least some example embodiments, the electronic device 201 may communicate with any one of a plurality of fixed transceiver base stations of the wireless network 101 within its geographic coverage area. The electronic device 201 may send and receive communication signals over the wireless network 101 after the required network registration or activation procedures have been completed. Signals received by the antenna 214 through the wireless network 101 are input to the receiver 212, which may perform such common receiver functions as signal amplification, frequency down conversion, filtering, channel selection, etc., as well as analog-to-digital (A/D) conversion. ND conversion of a received signal allows more complex communication functions such as demodulation and decoding to be performed in the DSP 217. In a similar manner, signals to be transmitted are processed, including modulation and encoding, for example, by the DSP 217. These DSP-processed signals are input to the transmitter 213 for digital-to-analog (D/A) conversion, frequency up conversion, filtering, amplification, and transmission to the wireless network 101 via the antenna 215. The DSP 217 not only processes communication signals, but may also provide for receiver and transmitter control. For example, the gains applied to communication signals in the receiver 212 and the transmitter 213 may be adaptively controlled through automatic gain control algorithms implemented in the DSP 217.

In some example embodiments, the auxiliary input/output (I/O) subsystems 250 may include an external communication link or interface; for example, an ethernet connection. The electronic device 201 may include other wireless communication interfaces for communicating with other types of wireless networks; for example, a wireless network such as an orthogonal frequency division multiplexed (OFDM) network. The auxiliary I/O subsystems 250 may include a vibrator for providing vibratory notifications in response to various events on the electronic device 201 such as receipt of an electronic communication or incoming phone call, or for other purposes such as haptic feedback (touch feedback).

In some example embodiments, the electronic device 201 also includes a removable memory module 230 (typically including flash memory, such as a removable memory card) and a memory interface 232. Network access may be associated with a subscriber or user of the electronic device 201 via the memory module 230, which may be a Subscriber Identity Module (SIM) card for use in a GSM network or other type of memory card for use in the relevant wireless network type. The memory module 230 is inserted in or connected to the memory card interface 232 of the electronic device 201 in order to operate in conjunction with the wireless network 101.

In at least some example embodiments, the electronic device 201 also includes a device orientation subsystem 249 including at least one orientation sensor 251 which is connected to the processor 240 and which is controlled by one or a combination of a monitoring circuit and operating software. The orientation sensor 251 detects the orientation of the device 201 or information from which the orientation of the device 201 can be determined, such as acceleration. In some example embodiments, the orientation sensor 251 is an accelerometer, such as a three-axis accelerometer. An accelerometer is a sensor which converts acceleration from motion (e.g. movement of the device 201 or a portion thereof due to the strike force) and gravity which are detected by a sensing element into an electrical signal (producing a corresponding change in output). Accelerometers may be available in one, two or three axis configurations. Higher order axis configurations are also possible. Accelerometers may produce digital or analog output signals depending on the type of accelerometer.

An orientation sensor 251 may generate orientation data which specifies the orientation of the electronic device 201. The orientation data, in at least some example embodiments, specifies the orientation of the device 201 relative to the gravitational field of the earth.

In some example embodiments, the orientation subsystem 249 may include other orientation sensors 251, instead of or in addition to accelerometers. For example, in various example embodiments, the orientation subsystem 249 may include a gravity sensor, a gyroscope, a tilt sensor, an electronic compass or other suitable sensor, or combinations thereof. In some example embodiments, the device orientation subsystem 249 may include two or more orientation sensors 251 such as an accelerometer and an electronic compass.

The electronic device 201 also includes a battery 238 as a power source, which is typically one or more rechargeable batteries that may be charged for example, through charging circuitry coupled to a battery interface 236 such as the data port 252. The battery 238 provides electrical power to at least some of the electrical circuitry in the electronic device 201, and the battery interface 236 provides a mechanical and electrical connection for the battery 238. The battery interface 236 is coupled to a regulator (not shown) which provides power V+ to the circuitry of the electronic device 201.

The electronic device 201 stores data 227 in an erasable persistent memory, which in one example embodiment is the flash memory 244. In various example embodiments, the data 227 includes service data including information required by the electronic device 201 to establish and maintain communication with the wireless network 101. The data 227 may also include user application data such as email messages, address book and contact information, calendar and schedule information, notepad documents, image files, and other commonly stored user information stored on the electronic device 201 by its user, and other data. The data 227 stored in the persistent memory (e.g. flash memory 244) of the electronic device 201 may be organized, at least partially, into one or more databases or data stores. The databases or data stores may contain data items of the same data type or associated with the same application. For example, email messages, contact records, and task items may be stored in individual databases within the device memory.

The electronic device 201 may, in some example embodiments, be a mobile communication device which may provide two principal modes of communication: a data communication mode and a voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by an email messaging application and output to the display 204. A user of the electronic device 201 may also compose data items, such as email messages; for example, using the input devices in conjunction with the display 204. These composed items may be transmitted through the communication subsystem 211 over the wireless network 101.

In the voice communication mode, the electronic device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input interfaces 206). Alternative voice or audio I/O subsystems, such as a voice message recording subsystem, may also be implemented on the electronic device 201. Although voice or audio signal output is typically accomplished primarily through the speaker 256, the display screen 204 may also be used to provide an indication of the identity of a calling party, duration of a voice call, or other voice call related information.

The processor 240 operates under stored program control and executes software modules 221 stored in memory such as persistent memory; for example, in the flash memory 244. As illustrated in FIG. 1, the software modules 221 include operating system software 223 and other software applications 225 such a user interface (UI) module. In the example embodiment of FIG. 1, the UI module is implemented as a stand-alone application 225. However, in other example embodiments, the UI module could be implemented as part of the operating system 223 or another application 225 or collection of applications.

The UI module may be provided as a computer software product. The computer software product may be provided in, on or supported by a computer readable medium which could be provided as all possible permanent and non-permanent forms of computer readable medium either transitory in nature, such as in a data transmission signal for example sent over the internet, or non-transitory in nature such as in the RAM 246 of the device 201 or other, non-volatile storage such as memory 230.

Figure 2:
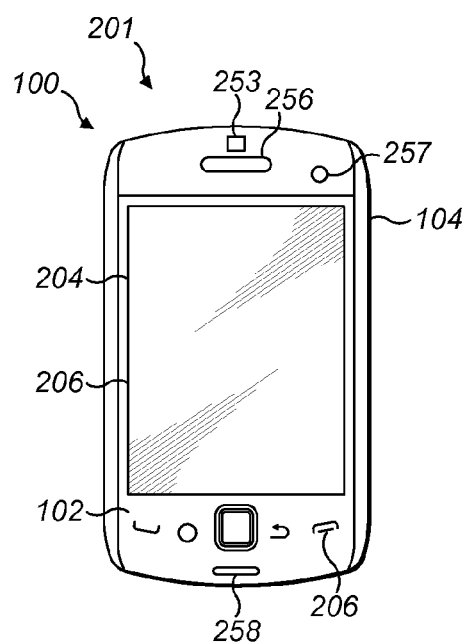
FIG. 2 is a front view of a phone in accordance with example embodiments of the present disclosure.

Referring now to FIG. 2, the electronic device 201 could be a cellular (or mobile) phone 100. For example, the phone 100 may have the ability to run third party applications which are stored on the phone.

The phone 100 may include the components discussed above with reference to FIG. 1 or a subset of those components. The phone 100 includes a housing 104 which houses at least some of the components discussed above with reference to FIG. 1.

In the example embodiment illustrated, the phone includes a display 204, which may be a touchscreen display which acts as an input interface 206. The display 204 is disposed within the phone 100 so that it is viewable at a front side 102 of the phone 100. That is, a viewable side of the display 204 is disposed on the front side 102 of the phone. In the example embodiment illustrated, the display 204 is framed by the housing 104.

The example phone 100 also includes other input interfaces 206 such as one or more buttons, keys or navigational input mechanisms. In the example illustrated, at least some of these additional input interfaces 206 are disposed for actuation at a front side 102 of the phone.

Figure 3:
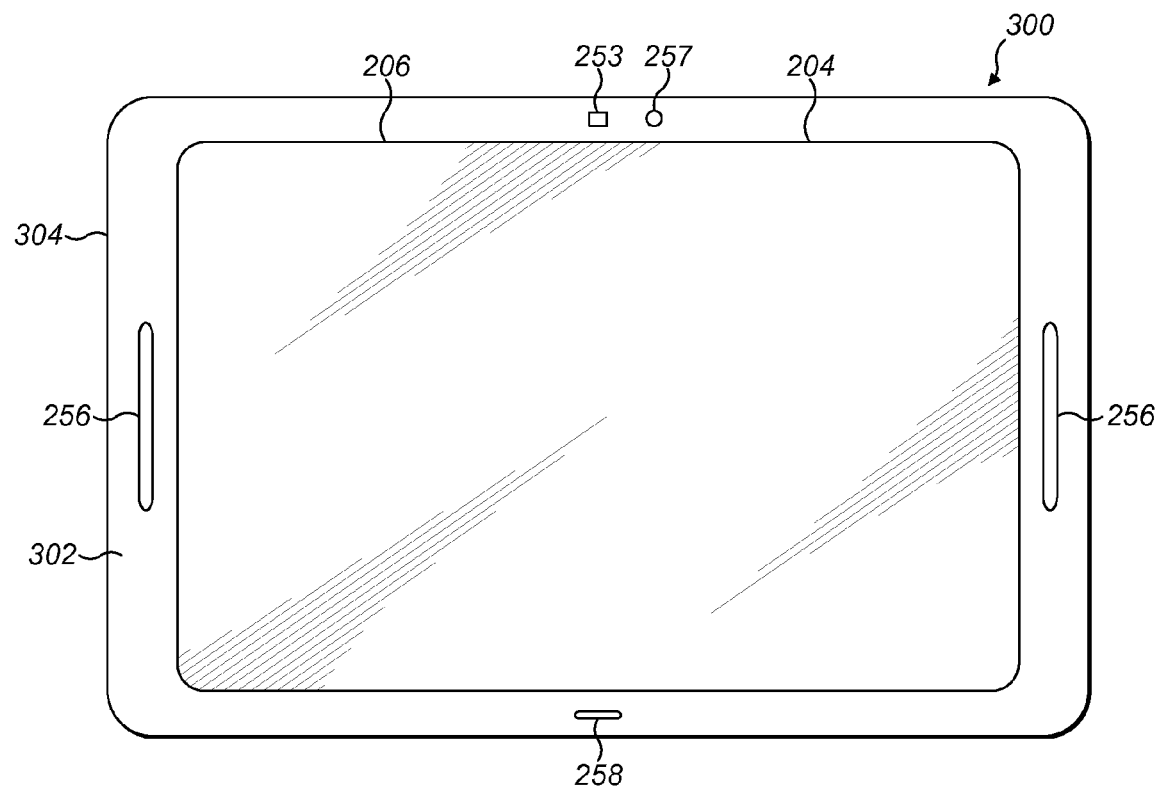
FIG. 3 is a front view of a tablet computer in accordance with example embodiments of the present disclosure.

Referring now to FIG. 3, a front view of another example of an electronic device 201, a tablet computer 300, is illustrated. The tablet computer 300 may include many of the same features and components of the phone 100 of FIG. 2. However, the tablet computer 300 of FIG. 3 is generally larger than the phone 100. The tablet computer 300 may include the components discussed above with reference to FIG. 1 or a subset of those components. The tablet computer 300 includes a housing 304 which houses at least some of the components discussed above with reference to FIG. 1. The tablet computer 300 could support cellular wireless communication and/or non-cellular wireless communication.

The tablet computer 300 includes a display 204, which may be a touchscreen display which acts as an input interface 206. The display 204 is disposed within the tablet computer 300 so that it is viewable at a front side 302 of the tablet computer 300. That is, a viewable side of the display 204 is disposed on the front side 302 of the tablet computer 300. In the example embodiment illustrated, the display 204 is framed by the housing 304.

Figure 4:
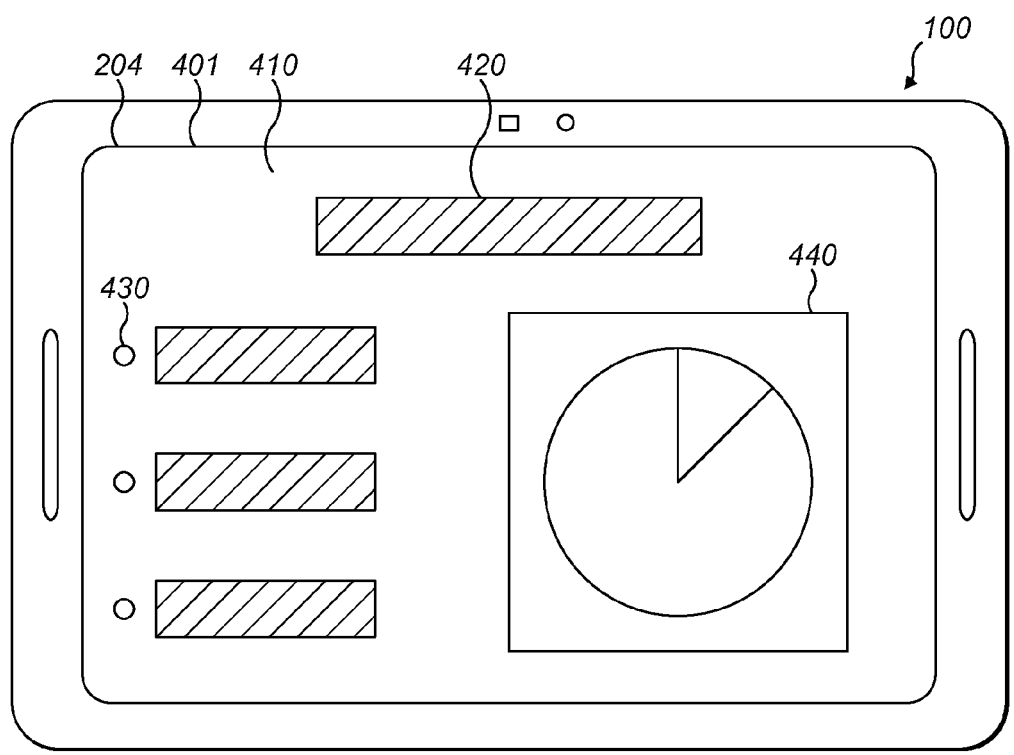
FIG. 4 illustrates an electronic device displaying a presentation in accordance with example embodiments of the present disclosure.

Reference will now be made to FIG. 4 which illustrates an electronic device 100 displaying on a display 204, a slide 401 of a presentation. The slide 401 of a presentation can be described as an arrangement of elements, where the elements displayed are used to deliver information and/or to add to the aesthetics of the slide. For example, the slide 401 displayed in FIG. 4 contains a background 410, a title 420, bullet points 430 and an image 440. Each of these elements may be customisable, for example the background 410 may be altered to a different colour, pattern, or picture; the title 420 and bullet points 430 may display different text in different font sizes and colours; and the image 440 may be a graphical representation of data, like a pie chart, or may serve a more aesthetic purpose, such as providing a visual cue.

In a slide-based presentation, a presentation is made up of many slides 401, each of which may provide a different arrangement of elements. Although slide-based presentations are the most common type used, the proposed solution is envisioned to be applicable to more complex presentations as well. For example, a presentation may not be made up of a set of discrete slides, but may instead be made up of one large, continuous arrangement of elements that covers a larger area than the display 204, and which may be traversed to display different regions of the arrangement of elements at a time. In another example embodiment, the presentation may be dynamically generated, where the arrangement of elements is automatically generated based on real-time user input and context-based intelligence, and therefore the 'slide' is simply the current arrangement of elements being presented.

Figure 5:
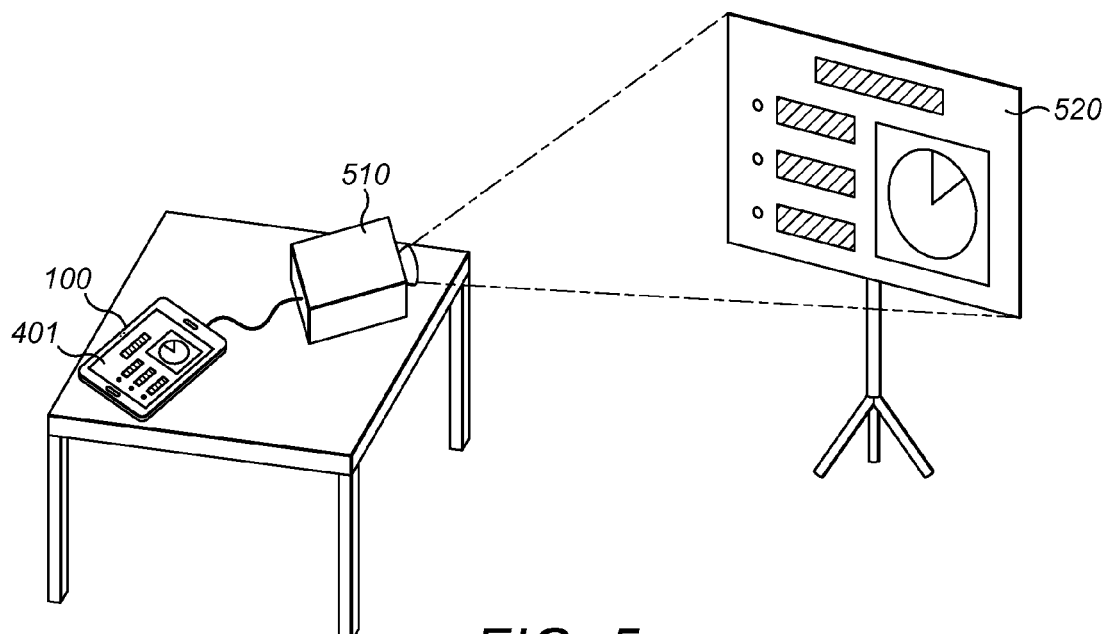
FIG. 5 illustrates an electronic device in accordance with an example embodiment transmitting a presentation to be displayed by an external display.

FIG. 5 shows an electronic device 100 being used to present a presentation 401. The electronic device 100 is connected to external hardware 510 that can display the presentation larger than an internal display 204 of the electronic device 100. The connection may be made by a physical connection (as shown) or may be connected wirelessly to the external hardware 510. The external hardware 510 may, for example, be a large screen display, or a projector 510 for displaying the presentation 401 on a projector screen 520, or a distribution system for broadcasting the presentation to users remotely. In a preferred embodiment, the small form-factor electronic device 100 is used in this configuration to render the presentation and have this rendering directly displayed to a larger audience.

Using small form-factor electronic devices 100 provides additional challenges compared to larger ones. With smaller batteries and fewer processing resources, the electronic device 100 needs to perform tasks with a view to minimise processor use, both to keep power usage low and also to minimise any slowdown caused by relying on slower hardware than on larger form-factor devices.

As already discussed, image elements used in presentations can serve a number of different purposes. For example, they may be used to provide information, or may be used for more for illustrative or aesthetic purposes. In this application, images that are more information-orientated will be referred to herein as 'functional images', and those that aren't will be referred to as 'non-functional images'. Making such a distinction between functional and non-functional images can be important when creating a presentation, as the type of image can help determine how it should be presented in a presentation. For example, an image used purely for aesthetic purposes can be used to fill any empty spaces, with a low priority in the overall arrangement of elements. A more functional image, however, may be of higher importance in the arrangement of elements and may therefore need to be presented as such.

Figure 6:
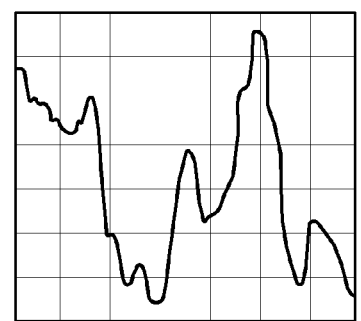
FIG. 6 shows examples of functional and non-functional images.
Figure 6:
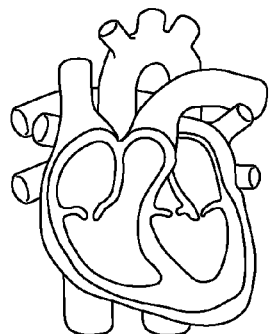
Figure 6:
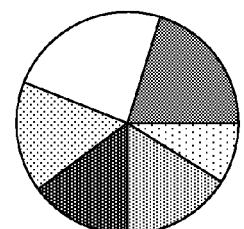
Figure 6:
Figure 6:

FIG. 6 illustrates a number of examples of what may be considered 'functional' and 'non-functional' images. A functional image could be a line chart 610, or a pie chart 630, or any other kind of graph or chart that presents a graphical representation of data. Another example of a functional image is a diagram, like the diagram of a heart 620, which provides a simplified representation of key features. Other examples of functional images may include maps, tables, engineering drawings, ideograms, pictograms, technical illustrations, sketches, and images made up primarily of text content.

An example of a non-functional image includes a painting 640, that has a primarily aesthetic function. Different from the diagram 620, the painting represented in image 640 is filled with a multitude of colours, shadings and gradients, with fewer hard lines distinguishing different parts of the image. Another example of a non-functional image is a photograph, like the photograph of a person 650. Similar to the painting 640, the photo represented in image 650 is more visually complex than the example functional images provided.

One way of determining if an image is functional could be to perform a number of algorithms on an image in order to determine if it is any one of a number of functional categories. For example, image recognition technology could be used to determine if an image is a pie chart by scanning for a circle and lines that divide the circle into sectors, before moving on to check if the image is a table by scanning for text laid out in predetermined ways, and subsequently moving on to further next checks for other specific functional image types. However, carrying out such image recognition processes can be resource intensive, which is undesirable in electronic devices, particularly portable ones. Therefore a faster, less resource intensive process is proposed for determining if an image is functional or non-functional.

Although functional images can convey a lot of information and data to a user, a common feature of many functional images is that they are not 'visually complex'. For example, although the line graph 610 illustrates a complex relationship between two variables, the visual representation only uses a single main line set against a grid of lines, and therefore only uses three different colours in the entire image (the background colour, the colour of the grid lines and the colour of the main line). As another example, the figure of a heart 620, conveys complex anatomical data, but due to the nature of such representative diagrams, the different regions of the heart are clearly distinguished by hard lines and sometimes by solid shading to more clearly distinguish the different regions. In this example of the heart 620, only two colours are used (the solid fill and the line colour). On the other hand the example non-functional images of FIG. 6 represent more visually complex images. The painting 640 contains different brush strokes, shadings and gradients and therefore uses a large variety of different colours in the image.

The present application uses this difference in visual complexity to carry out a very quick way to automatically determine whether an image may be functional or non-functional. One simple way of determining if an image is visually complex is to look at the variation of colours and shadings in an image.

Figure 7B:
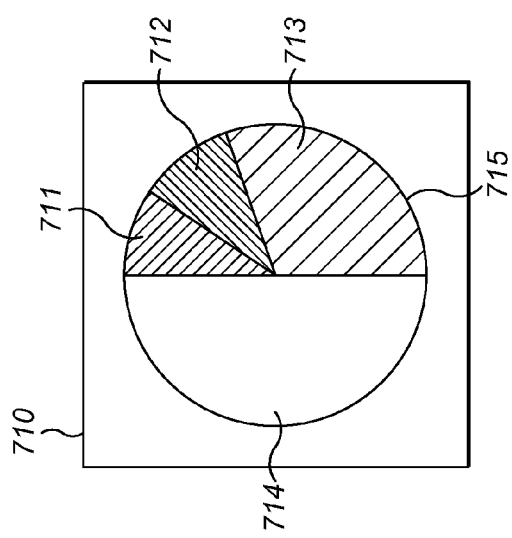
FIGS. 7a and 7b illustrate the difference in histograms generated from two example images in accordance with an example embodiment.
Figure 7B:
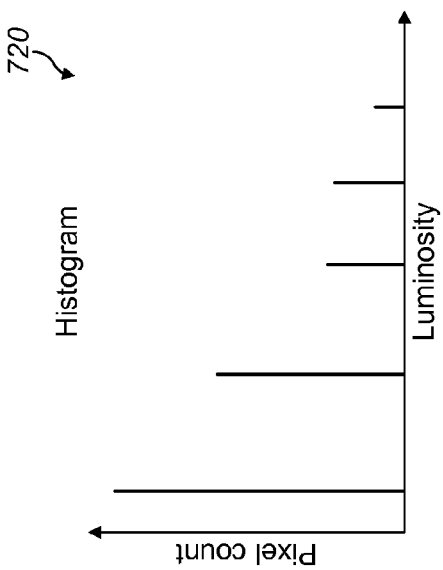
Figure 7A:
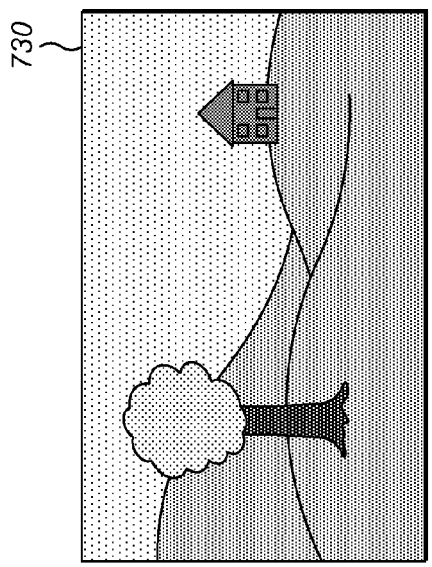
Figure 7A:
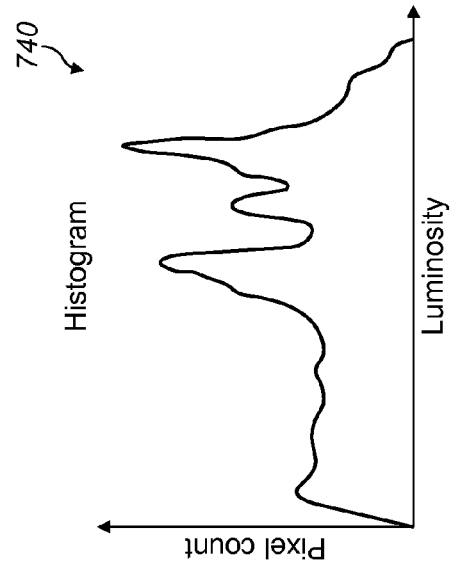

For example, FIG. 7a shows an image 710 that is to be processed by the electronic device to determine whether or not the image is functional. This image 710 only contains five different colours: the colours of the four different sectors, 711, 712, 713, and 714; and the colour of the lines 715. One efficient way of determining that few different colours are used is to create a histogram 720 of the number of pixels of different luminosities. On producing such a histogram 720, the device would determine that only five different luminosities are present in the image 710, and thus the device would label the image 710 as a functional image.

FIG. 7b shows how such a method would respond to a non-functional image, such as the photograph represented in image 730. This photo 730 may include a variety of textures, shadings and gradients, and therefore contain a large number of different colours. For example, the grass pictured in a photograph, although generally green, would use a variety of slightly different shades of green. Therefore, generating a histogram 740 of the different luminosities in the photo 730 results in a large range of different luminosities, indicating the large range of colours used in the photograph.

The algorithm used to determine whether an image is functional or non-functional will now be reviewed in greater detail. An image can be displayed as a large number of pixels arranged in a two-by-two array, each pixel having a colour associated with it. In a very simple example of an uncompressed 100×100 pixel bitmap image with an 8-bit colour depth, each pixel can have any one of the $2^8$=256 different colours available in the colour space. An algorithm may perform a single sweep through all 10,000 pixels (100×100) in the image and record how many pixels there are for each of the 256 different colours. To determine if there is a large or small variation in colours, the algorithm may look at how many pixels have certain colour values and then compare that with the total number of pixels in the image. If it is found that the majority of pixels have a limited range of colours, then the algorithm determines the image to be functional. In one example embodiment, the algorithm does this by calculating the number of pixels that have the top five colours of the image, divide that by the total number of pixels in the image, and if the result of that division is higher than 50%, then the image is determined to be functional. So, if this algorithm were performed on the pie chart 710, it would determine that 100% of the pixels have one of the top five colours in the image, and is therefore functional.

The 50% threshold provided above is only an example, and the algorithm may be altered to use different thresholds. For example, the algorithm may only look at the number of pixels with the most common colour, or may look at the number of pixels that have the top ten colours. The threshold for determining whether an image is functional or non-functional can also vary from the 50% provided in the example embodiment above, and may be as high as 100%, or a percentage lower than 50%. Overall, the algorithm provides some measure of the number of different colours used in an image. The thresholds used may be determined based on an initial calibration by the user, where the user indicates which images they consider to be functional for a small subset of images, and the proposed algorithm sets the threshold to match the user's indicated preferences.

In another example, rather than providing the algorithm with a bitmap with 256 colours available in its colour space, the image provided may be a greyscale image, which also has an 8-bit colour depth, but only provides 256 possible shades of grey rather than 256 different colour values. The algorithm works in substantially the same way, counting the number of pixels that have each shade of grey and determining if, for example, the pixels with the top five greyscale values make up over half of the pixels in the image.

The above examples have been provided for images with only 256 possible values possible for each pixel. However, the most common colour depths use 24-bits of colour. For a bitmap with a 24-bit colour depth, there would be $2^{24}$=16, 777,216 possible colour variations available for each pixel in the 'true color' colour space. Such a selection of colours arise from each of red, green and blue being provided with 256 possible shades, therefore resulting in the $256^3=2^{24}=16,777,216$ different colour combinations. If the algorithm were to calculate how many pixels there were with each of the $2^{24}$ different colour combinations, large amounts of storage space would be required to store such calculations for analysis.

One way of reducing the amount of resources used by this algorithm for large colour depths is to only analyse the equivalent greyscale value of each pixel, rather than the overall colour value. By converting a colour image to greyscale, it is still possible to determine if an image is visually complex by determining how many different shades there are, rather than identifying all the different colours. The image itself need not be converted to a greyscale image by the algorithm, but instead the algorithm could calculate the greyscale value of each pixel as it performs the analysis. To calculate the greyscale value of a pixel, one of many known algorithms may be used. One way would be to calculate the pixel luminance based on the colour values provided for that pixel, where the formula: Luminance=(0.2126×red)+(0.7152×green)+(0.0722×blue) may be used. This calculation effectively results in a weighted average of the three colour values provided for each pixel, and reduces the three 8-bit values to a single 8-bit value. Each of the colour values may be of the range [0-255] or of the range [0-1], and may be gamma corrected prior to averaging. The combination of colour values need not be limited to calculating a weighted average, but may be any linear combination of the values. For example, the 'lightness' may be calculated instead, which would be an un-weighted average of the RGB values.

The images used will often be compressed image formats (like JPEG), rather than the uncompressed format of a bitmap. Therefore, determining the individual colour values of each pixel may require some known pre-processing and decompression routines first. Some images may be in the form of vector graphics and so would have to be rasterised before analysis is performed on them.

In addition, the algorithm could be optimised for specific image types. For example, with file formats that use colour palettes, such as gif files, the algorithm could first check if the palette size is below a certain threshold. If an algorithm determines that a gif only has a 3-bit palette size, then there can only be a maximum of 8 different colours in the image, and is therefore likely to be a functional image, thus avoiding the step of performing a pixel-by-pixel analysis.

The pixel property being analysed need not be limited to the colour of the pixel or the luminance, and could instead be any property that can indicate if an image is visually complex or relatively uniform. For example, with certain image formats it may be more efficient to look at the chroma components of the pixels if the image is encoded in an image format that defines luma and chroma components rather than RGB values.

The proposed algorithms are designed to produce a quick estimation as to whether an image is functional or not, with an aim to use as few system resources as possible to do so. The proposed algorithm may not detect every functional image, as some functional images may have properties that make it appear non-functional to the algorithm. For example, a pie chart with sectors filled with gradients, would be determined to be non-functional due to the large variety of colours caused by having gradient fills rather than solid fills. However, compared to existing image recognition methods, the proposed algorithm provides enough efficiency advantages to outweigh a reduction in accuracy.

In the above examples, an image is determined to be functional if there is a low variation in pixel properties, and any image that is not identified as functional is treated as non-functional. It would be clear to a person skilled in the art to take the opposite approach of determining if an image is non-functional first by identifying a high variation in pixel properties, and any image that does not satisfy the criterion is determined to be functional.

Figure 8:
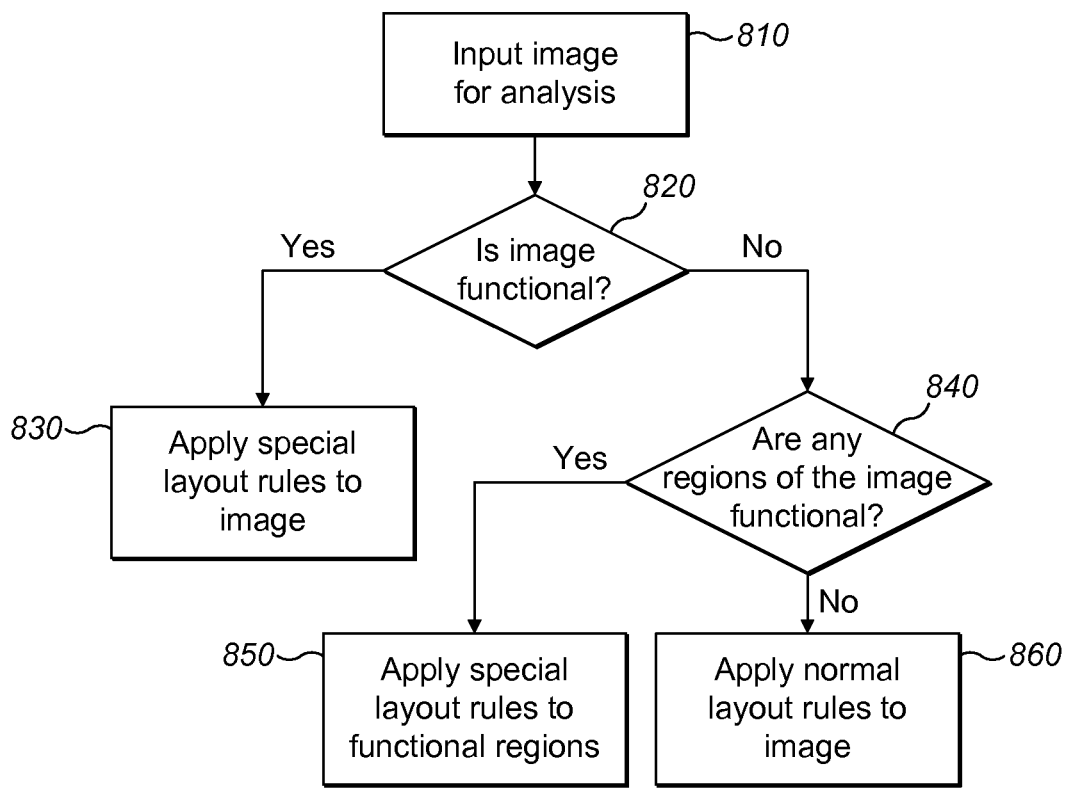
FIG. 8 shows a flow diagram of the method performed in an example embodiment of the present disclosure.

FIG. 8 is a flow diagram showing the steps of an example embodiment performed on each image element provided to the proposed presentation software for inclusion in a presentation. At step 810, the software receives an input image to analyse. This image may be an image provided by a user, or may be one of many images retrieved from a local or external collection of images. At step 820 the method determines whether or not the image should be considered functional or non-functional. If the image is determined to be functional, special layout rules are applied when arranging the image in the presentation. The layout rules may be applied the moment an image is determined to be functional, or the image may be flagged as a functional image so that in a later arrangement step, the special layout rules are applied. These special layout rules will be described in more detail in the description of FIGS. 9a to 9f. The overall aim of the special layout rules is to increase the visibility of the functional image in arrangement of elements, thereby highlighting its importance and ensuring it is treated with a higher priority than other, non-functional or less-functional elements.

In some embodiments, the step of determining whether an image is functional or non-functional may be performed on a system separate from the electronic device 100, so as to reduce the system load on the device. For example, there may be a cloud-based facility that analyses a large database of images and determines, in advance, whether they are functional or not. An external server may store this large collection of images along with meta data indicating whether they are functional or not. Therefore, when an electronic device is used to create a presentation it may download the image from an external server which has already determined whether or not the image is functional. It would be clear to a person skilled in the art that the processes described in this application can be carried out on a device separate from the electronic device 100 so as to reduce the resource requirements of the device.

At step 820, if an image is determined to be non-functional, the method may apply the same normal layout rules to the non-functional image as it would to other non-image elements of the presentation. In the embodiment presented in FIG. 8, however, an additional step is performed to non-functional images. Although an image may be determined to be non-functional overall, a further step 840 may determine whether any regions or parts of the non-functional image may be considered functional or important. If certain regions are determined to be functional, then at step 850, special rules are applied so that the functional regions are treated with a higher priority in the arrangement of elements, providing an increased visibility of these functional regions. To avoid confusion with the terminology of functional and non-functional images, the functional regions of a non-functional image will be herein referred to as salient regions. These salient regions may have the same properties as functional images, or they may have a more specific meaning as will be discussed in more detail in the description of FIGS. 10a and 10b. If a non-functional image is determined to have no salient regions, the normal layout rules are applied when arranging the image 860.

Step 830 of FIG. 8 shows how special layout rules are applied when an image is determined to be functional. As functional images, such as charts and figures provide information, it is desirable to increase the visibility of the image. Increasing the visibility of an image can be achieved a number of ways, a few examples of which are shown in FIGS. 9a to 9f.

Figure 9A:
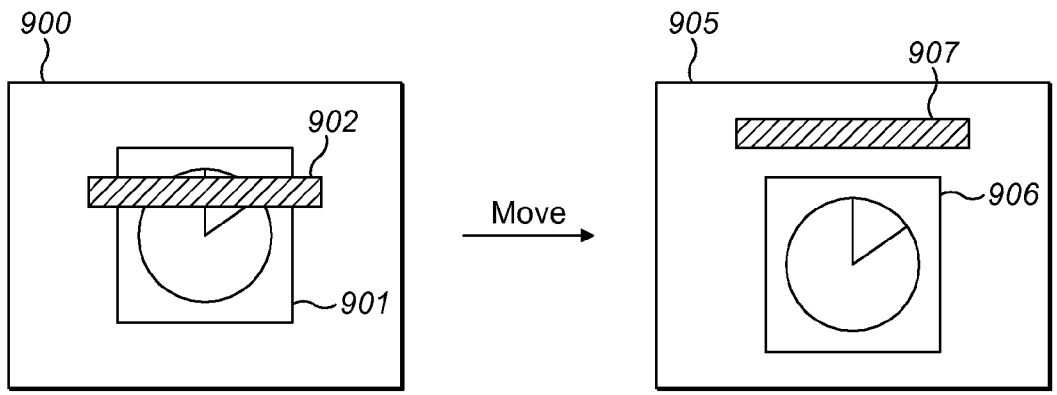
FIGS. 9a to 9f show example layout rules applied when an image is determined to be functional in accordance with example embodiments of the present disclosure.

FIG. 9a illustrates how elements in a slide 900 may be moved as a result of an image 901 being classified as functional. In this example, the pie chart 901 has been identified as a functional image and is being arranged on a slide 900 with a title element 902. One way of increasing the visibility of a functional image 901, is to move elements so that no part of the image 901 is obscured, and if this is not possible, moving elements so as to minimise how much of the image 901 is obscured by other elements. In this example, the slide 900 is rearranged to result in slide 905, where both the title element 907 and the functional image 906 have been moved so that they do not overlap one another, thereby increasing the visibility of image 906.

The arrangement illustrated in FIG. 9a may be implemented in a number of ways. In one example embodiment, all the elements of a slide 900 are arbitrarily laid out on the slide before an arrangement step is performed. This arrangement step takes into account whether any of the elements have been determined to be functional images, and applies special rules while performing the arrangement, moving either the functional image 901 itself, the other elements, or a combination thereof to ensure no part of the image 901 is obscured. In another example embodiment, the image 901 is identified as a functional image and is placed in the centre of the slide 900, with the only other element being the background element underneath. Later a title element 902 is added to the slide 901. On adding the title element 902, an arrangement step may be performed, determining that an element is obscuring the functional image 901, thus resulting in slide 905. In yet another embodiment, the unarranged slide 900 is at no point displayed to the user, but merely represents the internal logic of the software. As elements are added to a slide 900, the software internally rearranges the elements until the slide has been completed and is subsequently rendered and presented to the user. The examples provided in FIGS. 9a to 9f may be used purely for illustrative purpose to demonstrate the possible arrangement rules that may be applied to increase the visibility or prominence of a functional image.

Figure 9B:
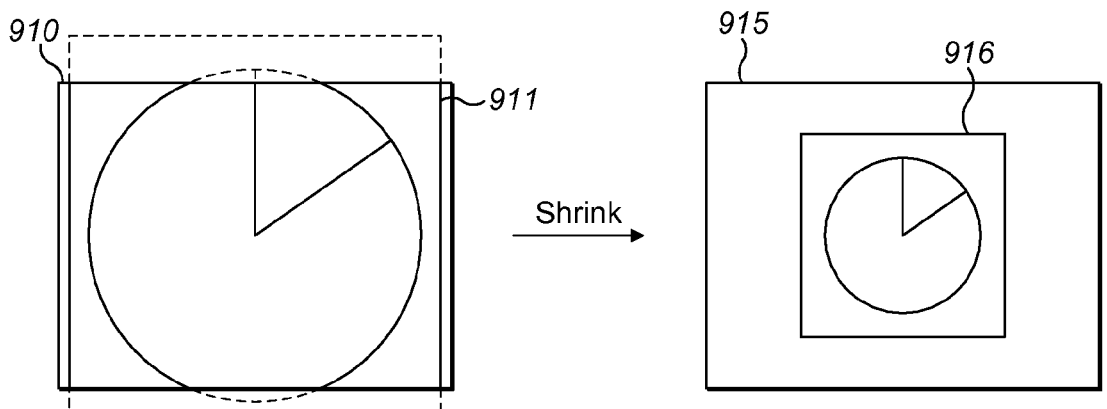

FIG. 9b shows how a functional image may be made smaller so as to increase its visibility. A slide 910 may contain a set of boundaries defining a region that would be visible when presented. Such a boundary may be fixed, or may be capable of varying depending on the display method. For example, if the electronic device is set to transmit the presentation to an external display with a different native aspect ratio to the internal display 204 of the electronic device, the electronic device may define the visible boundaries to be compatible with the aspect ratio of the external display. If the dimensions of a functional image 911 are larger than the visible boundaries of a slide 910, then when displaying or rendering the slide, parts of the functional image 911 would be cut off, so not all of the image would be visible. Therefore, to increase the visibility of the functional image 911, it may be shrunk so that the image 916 lies within the visible boundaries of the slide 915. In the example shown in slide 910, the functional image 911 could be shrunk in only the y-axis to allow it to fit within the slide 910. However, due to nature of functional images, in some embodiments, any scalar transformations to a functional image may be required to maintain the aspect ratio of the image. For example, where the functional image is a technical diagram displaying angles and text, it would be undesirable for the aspect ratio to be altered, even if doing so would result in the image fitting in the slide. In another example, an image that is already within the visible boundaries of a slide 910 may be shrunk to ensure that it fits on the same slide as other elements.

Figure 9C:
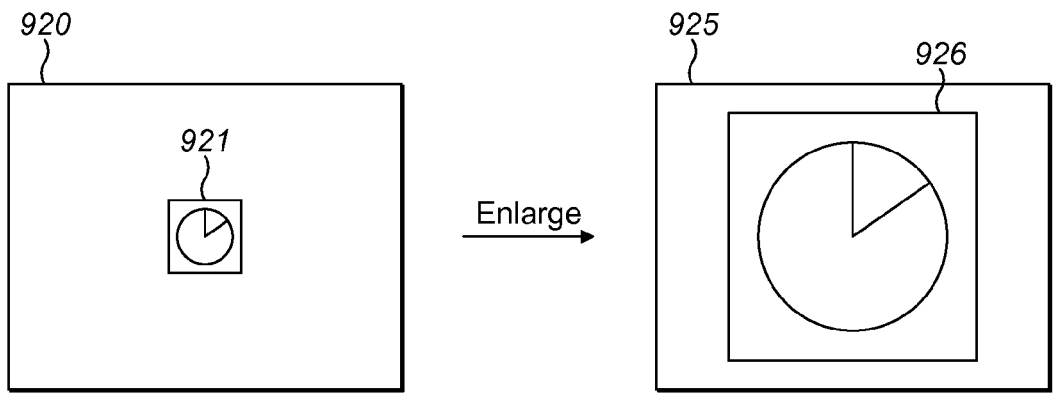

FIG. 9c shows how a functional image may be made larger to increase its visibility. A slide 920 may include an image element 921 that has been determined to be functional. By enlarging the image to a larger image 926 that fills more of the slide 925, the visibility and prominence of the image is increased. Limits may be in place to limit the level of scaling beyond a predetermined multiple of the original dimensions of the image to ensure that image quality is not reduced too much by the upscaling. Similar to the shrinking scenario in FIG. 9b, the aspect ratio of the functional image 921 may be fixed during the resizing.

Figure 9D:
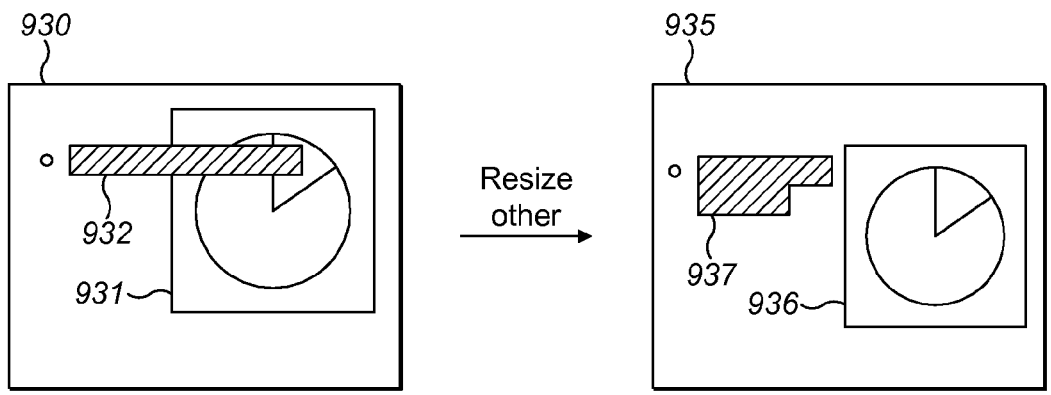

FIG. 9d illustrates how other elements in a slide can be resized or rearranged to increase the visibility of a functional image. In the example slide 930, there is a functional image 931 and a bullet point text element 932. In a default arrangement, the long bullet point text element 932 overlaps with the functional image 931, obscuring parts of the image. Shrinking the functional image 931 itself is one option. Although doing so would reduce the obscuration of the image 931, it would decrease the visibility in other ways by making it smaller. Therefore, an alternative is to rearrange or resize the other elements in the slide. As shown in resultant slide 935, the bullet point text 937 has been resized so it no longer overlaps with the functional image 936. This other element 937 has been re-arranged so that the text overflows onto two lines, essentially changing the aspect ratio of the element.

Figure 9E:
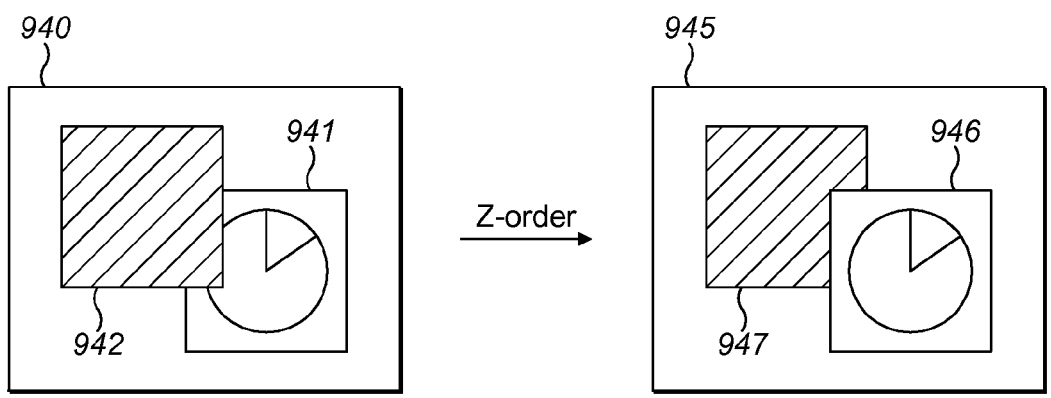

FIG. 9e illustrates how the z-ordering or layering of a slide can be altered to increase the visibility of a functional image. Example slide 940 shows a functional image 941 being overlapped and obscured by a non-functional element 942. In such an instance, the z-order can be altered so that the functional image 941 is brought to the front so that the image 946 lies above the non-functional image 947 as shown in resultant slide 945. This can be done by increasing the z-order of the functional image 941, decreasing the z-order of other elements, or a combination of both.

Figure 9F:
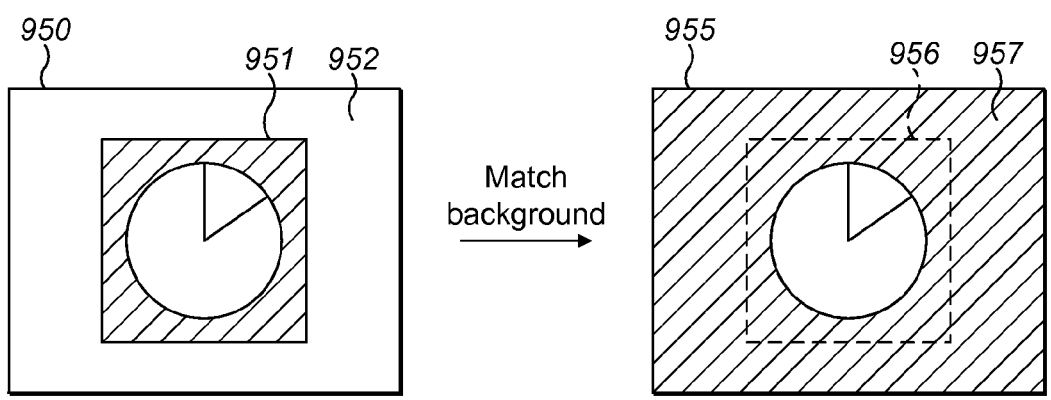

FIG. 9f illustrates another possible arrangement rule that aims to increase the visibility and prominence of a functional image by changing the background of the slide. In example slide 950, a functional image 951 lies on top of a default background 952. The functional image 951 itself has its own background that clashes with the background 952 of the slide 950, thereby distracting from the contents of the functional image 951. One way of overcoming this is to first determine whether the functional image 951 has a background colour, and if that background colour clashes with the background 952 of the slide 950, altering the background 952 to match the background colour of the functional image 951. One quick and efficient way to determine if an image 951 has a background colour is to analyse the colour values of all the pixels on the border of the image 951. If the proportion of border pixels having the same colour is determined to be above a certain threshold, such as 70% or 100%, the image 951 is identified as having a background colour. If this background colour is found to be different from the colour of the background 952 of the slide 950, the background 952 of the slide 950 may be changed to match the background colour of the functional image 951. In resultant slide 955, it shows the background 957 is now the same colour as the background of the functional image 956, and as a result the core of the functional image 956 is given greater prominence.

The layout rules illustrated in FIGS. 9a to 9f are only examples of the rules that may be applied when an image is determined to be functional, and other rules of with similar aims may be applied. The overall aim of these layout rules is to increase the visibility of a functional image compared to how it would look if such rules were not applied and/or to increase its visibility compared to the other elements in the slide. The example rules provided in these figures may be used in combination with one another to create a final arrangement, applying the rules to multiple elements at a time. When more than one functional image is identified in a given arrangement of elements, they may be given equal priority so that they both result in the same level of visibility (for example, the same size and the same distance from the centre of the slide). In another example embodiment, further steps may be used to determine which functional image should be given priority over another functional image, for example by identifying which functional image was imported first, or if a user has manually indicated that one is more important than another.

Once the presentation has been automatically arranged, a user may be permitted to perform manual edits to the presentation. However, even during such manual edits, layout rules may still be employed to guide the user and to maximise visibility of functional images during the edit. For example, the functional image may be locked so that the user cannot inadvertently crop or alter the aspect ratio without confirming that they wish to do so first.

Referring back to step 840 of FIG. 8, even if an image is determined to be non-functional, there may be regions of it that are determined to have a high level of saliency or importance. Such high saliency regions may be just as important as functional images and may therefore be treated as such. Examples of high saliency regions are illustrated in FIGS. 10a and 10b.

Figure 10A:
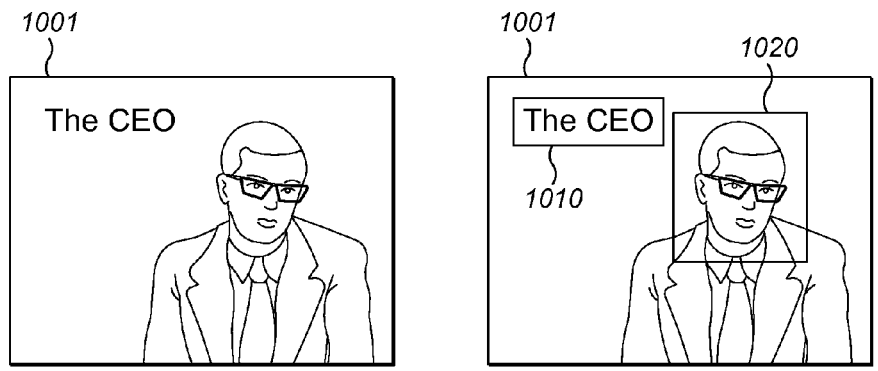
FIGS. 10a and 10b show examples of salient features in an image.

Image 1001 of FIG. 10a represents a photograph that has been identified as a non-functional image due to the high colour variation inherent in photographs. However, it may be undesirable for certain regions of this non-functional image to be obscured or given low visibility in an arrangement of elements. For example, in a slide about the CEO, text elements arranged on the same slide shouldn't cover the face of the CEO pictured, or text already in the image. Therefore, the proposed method may perform known image recognition techniques to identify high saliency regions. One known technique may be to use OCR technology to identify text in the photograph 1001, and mark out the region 1010 as a high saliency region. Another known technique may be to use facial recognition to identify faces in the image and mark out the region 1020 as a high saliency region.

Figure 10B:
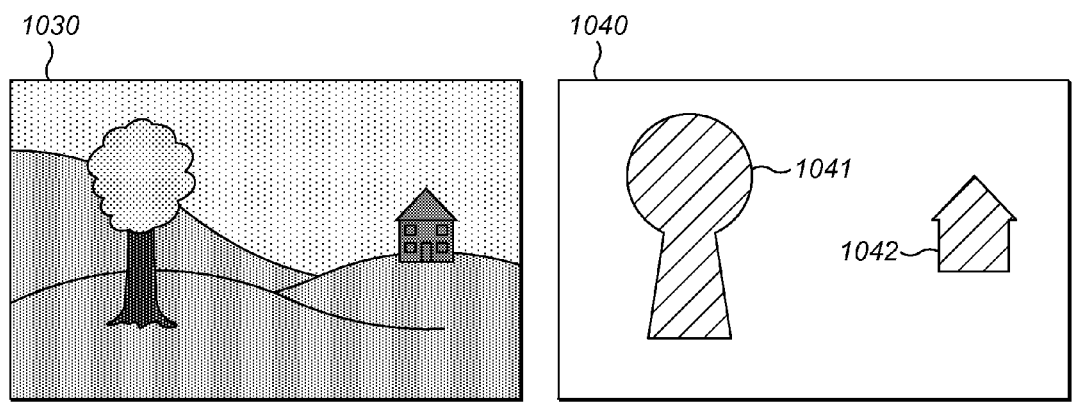

FIG. 10b illustrates other techniques that may be employed to find high saliency regions of a non-functional image, like the photograph 1030 of a landscape. A proposed method may generate a saliency map 1040 using known techniques to identify all regions of the image 1030 that have a high saliency. Examples of such techniques may include looking at the uniqueness of certain regions, where it is determined that certain areas have colours distinct from colours used in the rest of image. For example, the tree and house in the image 1030 may be found to have contrasting colours to the majority of the picture which is mainly light greens and blues. Techniques may look for well-defined lines that define discrete objects of similar properties, or may look for objects that are in focus compared to out of focus backgrounds. The result of such the techniques is a map 1040 that highlights regions of high saliency such as the tree 1041 and house 1042. This may be combined with the techniques shown in FIG. 10a, so that saliency maps highlight regions that contain text or faces.

Figure 11A:
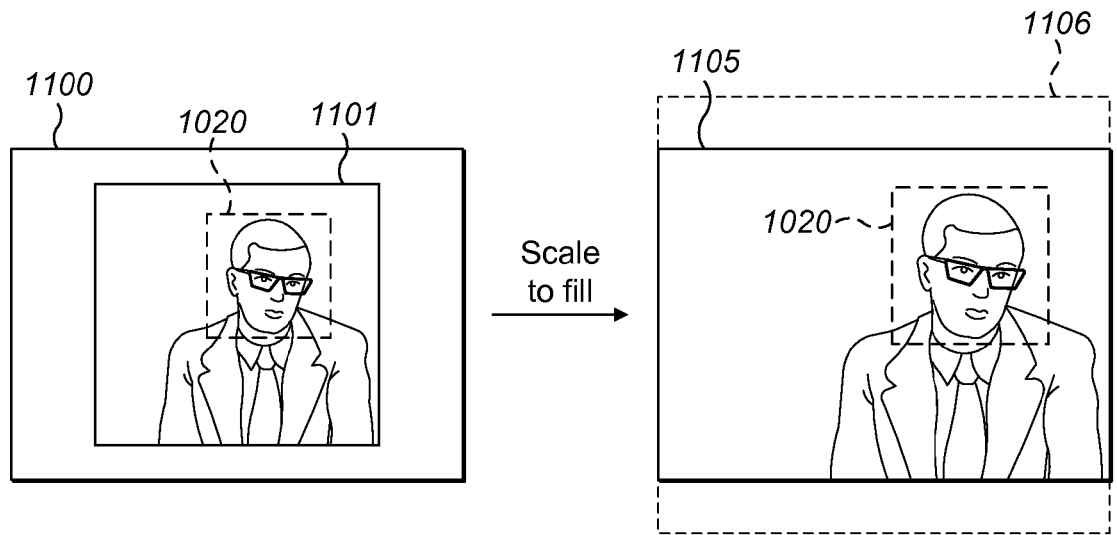
FIGS. 11a and 11b show example layout rules applied when salient regions are found in a non-functional image in accordance with example embodiments of the present disclosure.
Figure 11B:
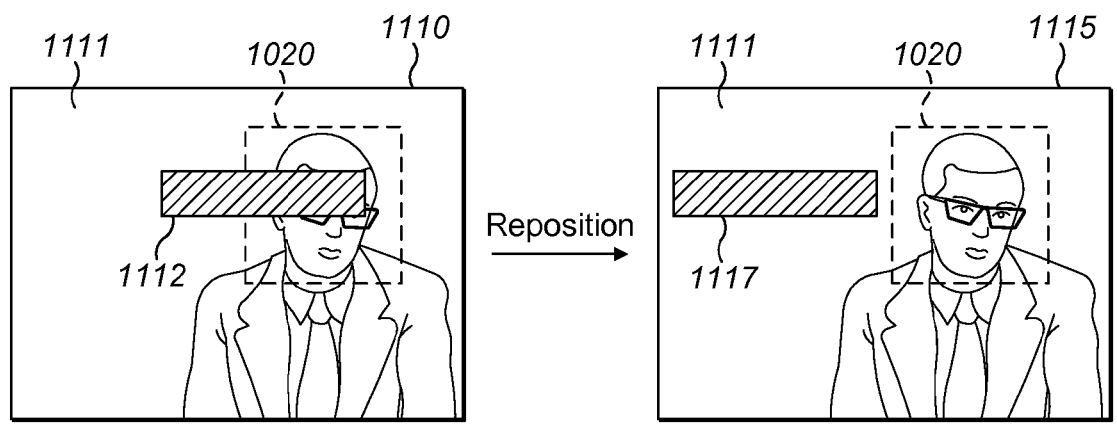

Once regions of high saliency have been detected in a non-functional image, special layout rules may be applied when arranging the elements of a slide. Examples of possible rules are shown in FIGS. 11a and 11b. The special rules applied to regions of high saliency have substantially the same aim as the rules applied with respect to functional images. However, instead of increasing the visibility of the image as a whole, the special rules aim to increase the visibility only of the high saliency regions.

FIG. 11a illustrates a scaling rule applied to non-functional images with a high saliency region. In a default arrangement 1100, a non-functional image 1101 with a high saliency region 1020 occupies a portion of the slide. As this image 1101 is a non-functional image, it may be increased in size to fill the entire slide 1105, thus acting as a background image 1106. Unlike with functional images, because the image 1106 is a non-functional image, parts of it are permitted to lie outside the visible boundaries of the slide 1105. However, as there is a high saliency region 1020, additional, special rules are applied. Although the non-functional image 1106 can be scaled to fill the entire slide 1105 so that some of it is not visible, the high saliency region cannot lie outside the visible areas of the slide 1105. In other words, the non-functional image can be scaled as much as necessary, regardless of the visual boundaries, as long as the high saliency regions do stay within the visual boundaries. Similarly, the image 1101 may be scaled substantially more, so that the salient region 1020 fills up most of the slide, while the rest of the non-functional image 1106 lies outside the visible region.

FIG. 11b illustrates another rule that can be applied with regard to high saliency regions. In slide 1110, the non-functional image 1111 with high saliency region 1020 is initially arranged with a text element 1112. Similar to the scenario in FIG. 9a, the text element 1112 is obscuring the high saliency region 1020, thereby reducing its visibility. To increase the visibility of the high saliency region, the text element 1112 is repositioned to position 1117 so that it does not overlap the high saliency region 1020, as shown in resultant slide 1111. Even though the text element 1117 no longer overlaps the high saliency region 1020, it does overlap and obscure the base non-functional image 1115.

The special layout rules illustrated in FIGS. 11a and 11b are only a few of the example layout rules that can be applied. Layout rules for functional images as illustrated in FIGS. 9a to 9f may be modified to increase the visibility of salient regions of non-functional images.

In an example embodiment, if a high saliency region is detected in a non-functional image, the image as a whole may have the same rules applied to it as would a functional image. This may be implemented where it is found that the high saliency region makes up a substantial portion of the non-functional image.

Embodiments have been described herein by way of example and these embodiments are not intended to be limiting. Rather, it is contemplated that some embodiments may be subject to variation or modification without departing from the spirit and scope of the disclosed solutions.

It is to be understood that the present disclosure includes all permutations of combinations of the optional features set out in the embodiments described above. In particular, it is to be understood that the features set out in the appended dependent claims are disclosed in combination with any other relevant independent claims that may be provided, and that this disclosure is not limited to only the combination of the features of those dependent claims with the independent claim from which they originally depend.

The invention claimed is:

1. A computer-implemented method of generating a presentation comprising an arrangement of elements including a digital image comprising a plurality of pixels, the method comprising:
   analysing a variation of a property of the pixels in the digital image;
   when said variation satisfies a predetermined criterion:
      determining the digital image is functional; and
      in response to receiving text to add to the presentation, adjusting a visual parameter of the digital image to prevent the received text from overlapping the digital image, wherein a function image includes at least one of a graphical representation of data, an illustration, or text; and,
   when said variation in the digital image does not satisfy the predetermined criterion and has a high saliency relative to other regions in the presentation:
      in response to receiving text to add to the presentation, adjusting a visual parameter of the digital image to prevent the received text from overlapping the digital image; and
   when said variation in the digital image does not satisfy the predetermined criterion and has a low saliency relative to other regions in the presentation:
      in response to receiving text to add to the presentation, permitting the received text to overlap the digital image.

2. The method of claim 1, wherein the adjustment includes scaling the digital image so that no portion of the digital image lies outside visible boundaries of the presentation.

3. The method of claim 1, wherein the adjustment includes arranging other elements of the presentation so that they do not overlap the digital image.

4. The method of claim 1, wherein the adjustment includes arranging the z-order of the elements of the arrangement so that the digital image has a higher z-order than other elements of the presentation.

5. The method of claim 1, wherein the adjustment includes scaling the digital image to increase its size in the arrangement of elements.

6. The method of claim 1, wherein the adjustment includes maintaining an aspect ratio of the digital image.

7. The method of claim 1, wherein the adjustment includes inhibiting cropping of the digital image.

8. The method of claim 1, wherein the adjustment includes positioning the digital image towards the centre of the arrangement of elements.

9. The method of claim 1, wherein said pixel luminance is calculated as a linear combination of pixel colour components.

10. The method of claim 1, wherein the analysing comprises analysing a histogram of said pixel luminance of the pixels in the digital image.

11. The method of claim 1, wherein the predetermined subset of values comprises a predetermined number of the most common values in the digital image.

12. The method of claim 1, wherein the determining that a region of the digital image has a high saliency comprises generating a saliency map of the digital image.

13. The method of claim 1, wherein the determining that a region of the digital image has high saliency comprises detecting one or more of faces and text regions in the digital image.

14. The method of claim 1, wherein the adjustment includes scaling the digital image to extend to a visible boundary of the presentation while ensuring no portion of said region of the digital image lies outside any visible boundaries of the presentation.

15. The method of claim 1, wherein the adjustment includes arranging other elements of the presentation so that they do not overlap said region, while permitting the other elements to overlap other regions of said digital image.

16. The method of claim 1, wherein said elements in the arrangement include one or more of: a background element, another digital image, a bullet element, a text element, and a title element.

17. The method of claim 1, wherein the predetermined criterion comprises the variation being below a predetermined threshold.

18. An electronic device comprising:
   one or more processors; and,
   memory comprising instructions which, when executed by one or more of the processors, cause the device to:
   analyse a variation of a property of the pixels in the digital image;
   when said variation satisfies a predetermined criterion:
      determine the digital image is functional; and
      in response to receiving text to add to the presentation, adjust a visual parameter of the digital image to prevent the received text from overlapping the digital image, wherein a function image includes at least one of a graphical representation of data, an illustration, or text; and,
   when said variation in the digital image does not satisfy the predetermined criterion and has a high saliency relative to other regions in the presentation:
      in response to receiving text to add to the presentation, adjust a visual parameter of the digital image to prevent the received text from overlapping the digital image; and
   when said variation in the digital image does not satisfy the predetermined criterion and has a low saliency relative to other regions in the presentation:
      in response to receiving text to add to the presentation, permit the received text to overlap the digital image.

19. A non-transitory computer-readable medium comprising instructions which, when executed by one or more processors of an electronic device, cause the device to:
   analyse a variation of a property of the pixels in the digital image;
   when said variation satisfies a predetermined criterion:
      determine the digital image is functional; and
      in response to receiving text to add to the presentation, adjust a visual parameter of the digital image to prevent the received text from overlapping the digital image, wherein a function image includes at least one of a graphical representation of data, an illustration, or text; and,
   when said variation in the digital image does not satisfy the predetermined criterion and has a high saliency relative to other regions in the presentation:
      in response to receiving text to add to the presentation, adjust a visual parameter of the digital image to prevent the received text from overlapping the digital image; and
   when said variation in the digital image does not satisfy the predetermined criterion and has a low saliency relative to other regions in the presentation:
      in response to receiving text to add to the presentation, permit the received text to overlap the digital image.

* * * * *